United States Patent [19]

Hattori et al.

[11] Patent Number: 4,460,955

[45] Date of Patent: Jul. 17, 1984

[54] STABILIZING POWER SUPPLY APPARATUS

[75] Inventors: Masayuki Hattori, Hachioji; Shigeo Nakamura, Hino, both of Japan

[73] Assignee: Fanuc Ltd., Tokyo, Japan

[21] Appl. No.: 452,139

[22] Filed: Dec. 22, 1982

[30] Foreign Application Priority Data

Dec. 25, 1981 [JP] Japan .............................. 56-211459

[51] Int. Cl.³ ........................................ H02P 13/24

[52] U.S. Cl. .................................. 363/91; 323/254

[58] Field of Search .................. 323/249, 254; 363/74, 363/75, 91, 95, 96, 97

[56] References Cited

U.S. PATENT DOCUMENTS

| | | | |
|---|---|---|---|
| 3,200,328 | 8/1965 | Green . | |
| 3,246,170 | 4/1966 | Olshan . | |
| 3,624,405 | 11/1971 | Bishop et al. . | |
| 4,217,632 | 8/1980 | Bardos et al. | 363/91 X |
| 4,375,077 | 2/1983 | Williams | 363/91 |

FOREIGN PATENT DOCUMENTS

| | | |
|---|---|---|
| 1438664 | 4/1969 | Fed. Rep. of Germany . |
| 2046462 | 4/1971 | Fed. Rep. of Germany . |

*Primary Examiner*—William M. Shoop

*Attorney, Agent, or Firm*—Staas & Halsey

[57] ABSTRACT

A stabilizing power supply apparatus including, as a switching element, a magnetic amplifier supplied with a rectangular wave voltage produced by and controlled by reset current. An inverter, an error sensing circuit senses a difference between the output voltage of the magnetic amplifier and a reference voltage to produce an error signal corresponding to the sensed difference. An amplifier circuit amplifies the error signal into the reset current for the magnetic amplifier. The amplifier circuit includes an NPN-type transistor for amplifying the control current into the reset current and second diodes. The first diode has an anode terminal connected to a negative power supply line and a cathode terminal connected to the collector of the transistor in order that charge will not accumulate on the transistor base the second diode has an anode terminal connected to the emitter of the transistor and a cathode terminal connected to the magnetic amplifier. The reset current is applied to the magnetic amplifier through the second diode to hold the output voltage of the apparatus constant by regulating the on/off timing of the magnetic amplifier in accordance with the difference between the magnitude of the output voltage and the magnitude of the reference voltage.

4 Claims, 5 Drawing Figures

STABILIZING POWER SUPPLY APPARATUS

BACKGROUND OF THE INVENTION

This invention relates to a stabilizing power supply, and more particularly, to a stabilizing power supply apparatus using a magnetic amplifier as a switching element, wherein the on/off timing of the magnetic amplifier is controlled to modulate the pulse width of an inverted output signal and generate an output voltage having a predetermined magnitude.

A stabilizing power supply apparatus known in the art employs a magnetic amplifier as a switching element. The on/off timing of the magnetic amplifier is regulated based on the magnitude of the apparatus output voltage in order to modulate the pulse width of a rectangular voltage waveform produced at the output of an inverter, followed by rectifying and smoothing the modulated voltage to generate an output voltage having the desired magnitude.

FIG. 1 is a block diagram illustrating such a stabilizing power supply apparatus. The apparatus includes a full-wave rectifier 12 using diodes which receive an alternating current generated by an AC power supply 11 and a smoothing circuit 13 comprising a capacitor which receives the output of the rectifier 12. The inverter 14 has a switching device (not shown) for converting the DC voltage output from the smoothing circuit 13 into a rectangular wave voltage IRS and a transformer (not shown) for transforming the rectangular wave voltage. The magnetic amplifier 15 acts as a switching element and receives the signal IRS. The rectifying and smoothing are provided by a rectifying circuit 16 receiving the modulated voltage from the magnetic amplifier 15 and a second smoothing circuit 17 comprising a choke coil and a capacitor (not shown) for smoothing the output of the rectifier 16. An error sensing circuit 18 generates an error signal (either a voltage or current) having a magnitude corresponding to a difference between the magnitude of the output of the second smoothing circuit 17 and the magnitude of a reference voltage. The amplifier circuit 19 receives the error signal from the error sensing circuit 18 and produces a flux reset voltage based on the magnitude of the error signal which controls the on/off timing of the magnetic amplifier 15. The magnetic amplifier 15 and amplifier circuit 19 constitute a pulse width modulating circuit.

The AC voltage input to the apparatus is rectified and smoothed by the rectifier 12 and smoothing circuit 13 into a DC voltage having a prescribed magnitude of from 100 to several hundred volts. The DC voltage is then converted by the inverter 14 into a rectangular wave voltage having a prescribed frequency of from several kilohertz to 100 kilohertz. The magnetic amplifier 15, rectifying circuit 16 and smoothing circuit 17 cooperate to convert the resulting signal IRS into an output voltage having a predetermined magnitude for application to a load. Any fluctuation in the magnitude of the output voltage is sensed by the error sensing circuit 18 which responds by delivering a corresponding error signal to the amplifier circuit 19. The latter supplies the magnetic amplifier 15 with a flux reset voltage on the basis of the error signal magnitude, thereby regulating the on/off timing of the magnetic amplifier to pulse-width modulate the rectangular voltage output from the inverter 14, thereby holding the output voltage of the apparatus at a constant magnitude.

More specifically, in the stabilizing power supply apparatus of the type described, the rectangular voltage IRS (FIG. 2) output from the inverter 14 has its pulse width Pw modulated based on the magnitude of the apparatus output voltage. In other words, if the output voltage fluctuates for some reason (for example, due to a fluctuation in the input signal or in the load), then the arrangement operates to enlarge the pulse width Pw when the magnitude of the output voltage falls below the magnitude of the reference voltage, and to diminish the pulse width when the magnitude of the output voltage exceeds the magnitude of the reference voltage, thereby maintaining an output voltage having a constant magnitude.

In the above-described conventional stabilizing power supply apparatus which uses a magnetic amplifier 15 as a switching element, the effectively utilizable pulse width is small because the magnetic amplifier 15 has a lengthy dead time. In other words, the effective pulse width is smaller than the pulse width Pw of the inverter output voltage IRS shown in FIG. 2. As a consequence, the output voltage cannot be varied over a wide range and there is a decline in the stability of the output voltage with respect to a fluctuation in input voltage. In modern power supplies, moreover, the use of higher switching frequencies is common, so that there is a further reduction in the effective duty cycle (defined as pulse width divided by period). This makes the above-mentioned defect of the prior art all the more pronounced.

SUMMARY OF THE INVENTION

Accordingly, an object of the present invention is to provide a stabilizing power supply apparatus capable of reducing the dead time of a magnetic amplifier and of enlarging the utilizable pulse width.

According to the present invention, the foregoing and other objects are attained by providing a stabilizing power supply apparatus having, as a switching element, a magnetic amplifier supplied with a rectangular wave voltage produced by an inverter, an error sensing circuit for sensing a difference between the output voltage of the magnetic amplifier and a reference voltage to produce an error signal corresponding to the sensed difference, and an amplifier circuit for amplifying the error signal, serving as a control current, into a reset signal which is applied to the magnetic amplifier. According to the invention, the amplifier circuit includes an NPN-type transistor for amplifying the error signal, namely the control current, received from the error sensing circuit, a first diode having an anode terminal connected to a negative power supply line and a cathode terminal connected to the collector of the transistor, and a second diode having an anode terminal connected to the emitter of the transistor and a cathode terminal connected to the magnetic amplifier. The reset current is applied to the magnetic amplifier through the second diode to hold the output voltage of the apparatus constant by regulating the on/off timing of the magnetic amplifier in accordance with the difference between the magnitude of the output voltage and the magnitude of the reference voltage. With the arrangement of the present invention, a current does not flow from the base to the collector of the transistor and then into the negative power supply line when the output voltage of the inverter is positive. As a result, charges do not accumulate on the transistor base so that it is possible to enlarge the effective pulse width of the output of the apparatus. This in turn makes it possible to hold the output voltage steady for a wide range of input voltages, and to widen the range over which the output voltage of the apparatus can be varied.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 3:
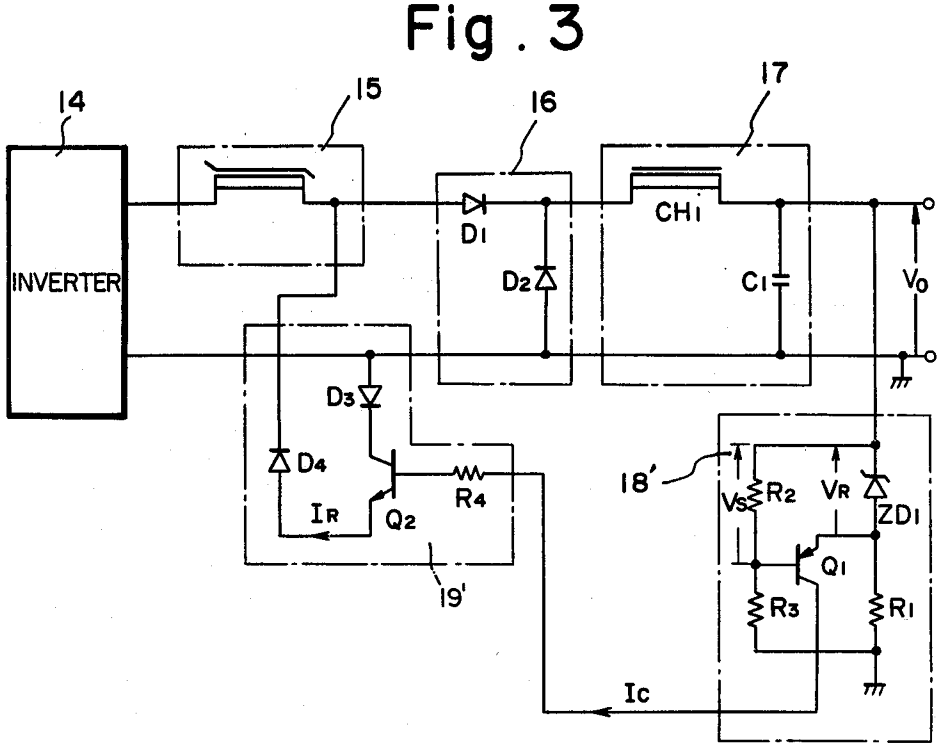
FIG. 3 is a circuit diagram illustrating a stabilizing power supply apparatus embodying the present invention.

Referring now to FIG. 3 illustrating an embodiment of the present invention, the rectifying circuit 16 includes diodes D1 and D2, and the smoothing circuit 17 is constituted by a choke coil CH1 and capacitor C1. The error sensing circuit 18' includes a Zener diode ZD1, resistors R1 through R3, and a PNP-type transistor Q1. The Zener diode ZD1 and resistor R1, and the resistors R2, R3 and comprise series circuits that are connected between the positive and negative power supply lines. A voltage $V_S$ resulting from the voltage-dividing action of the resistors R2 and R3 is applied to the base of the transistor Q1. The emitter of the transistor Q1 is supplied with the terminal voltage $V_R$ of the Zener diode ZD1, the voltage $V_R$ serving as a provisional reference voltage.

The arrangement is such that the above-mentioned voltage $V_S$, obtained by dividing the smoothing circuit output voltage $V_o$ by the constant ratio (R2+R3)/R2, is compared against the terminal voltage $V_R$. In other words $V_R$ and $$\frac{R2}{R2+R3}\cdot V_o,$$

which are equivalent to $$\frac{R2+R3}{R2}\cdot V_R$$

and $V_o$, are compared, where $$\frac{R2+R3}{R2}\cdot V_R$$

is the apparent reference voltage. Based on the comparison operation, the error sensing circuit 18' produces a control current $I_C$, which flows from the collector of transistor Q1, as the error signal dependent upon the difference between the output voltage $V_o$ and the reference voltage $$\frac{R2+R3}{R2}\cdot V_R.$$

Thus, in accordance with the construction and operation of the error sensing circuit 18', and neglecting the base-emitter voltage of the transistor Q1, an increase in the output voltage $V_o$ relative to the reference voltage $$\frac{R2+R3}{R2}V_R$$

causes an increase in the control current $I_C$. Conversely, a decline in the output voltage $V_o$ in comparison with the reference voltage $$\frac{R2+R3}{R2}V_R$$

results in a reduced control current $I_C$.

An amplifier circuit 19' includes an NPN-type transistor Q2 for amplifying the control current $I_C$, a first diode D3 a second diode D4 and a resistor R4. The first diode D3 has an anode terminal connected to the negative power supply line and a cathode terminal connected to the collector of the transistor Q2. The second diode D4 has an anode terminal connected to the emitter of the transistor Q2 and a cathode terminal connected to the output side of the magnetic amplifier 15. The resistor R4 has one end connected to the input terminal of the amplifier circuit 19', and the other end connected to the base of the transistor Q2. The control current $I_C$ from the output of the error sensing circuit 18' is applied to the base of the transistor Q2 through the resistor R4 and is amplified by the transistor Q2 into a reset current $I_R$ applied to the magnetic amplifier 15.

Figure 4B:
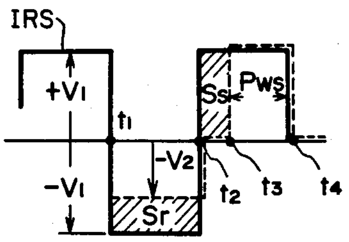
FIG. 4B is a waveform diagram useful in explaining pulse width modulation performed by a magnetic amplifier.
Figure 4A:
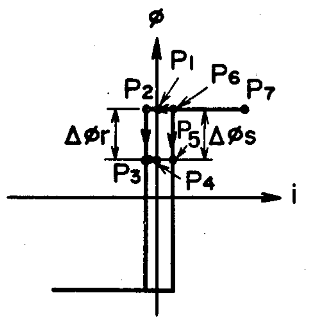
FIG. 4A is the o-I characteristic of the magnetic amplifier 15.

The $\phi - I$ characteristic of the magnetic amplifier 15 has a rectangular hysteresis loop as shown in FIG. 4A. The inductance L of the magnetic amplifier 15, expressed by $n(d\phi/di)$ (where n is the number of winding turns), is zero at saturation but takes on a very large value when there is a change in the magnetic flux. Assume that the magnetic amplifier 15 is saturated, so that the inductance is zero. In other words, assume that the magnetic amplifier 15, serving as a switching element, is in the fully conductive or ON state. When the output voltage IRS of the inverter 14 changes from +V1 to −V1 (FIG. 4B) at time time $t_1$ under the above-stated condition, a voltage −V2 appears at the output side of the magnetic amplifier 15 due to the reset current obtained by amplification, via transistor Q2, of the control current $I_C$. As a result, a reverse polarity reset voltage of V1−V2 is impressed upon the magnetic amplifier 15 from time $t_1$ to time $t_2$, the product of voltage and time being indicated by the shaded portion Sr of FIG. 4B. In accordance with the voltage-time product Sr, the operating point on the $\phi - I$ characteristic shifts from P1 to P2, from P2 to P3, and then from P3 to P4, the flux at the latter point being $\Delta\phi_r$ less than at saturation. Thus, the effect of the foregoing operation is to reset the flux of the magnetic amplifier 15. From point P2 onward, the inductance L becomes extremely large, placing the magnetic amplifier in the OFF or non-conductive state.

The magnetic amplifier 15 remains in the OFF state and, at time $t_2$, the output voltage IRS of the inverter 14 changes from −V1 back to +V1. When this occurs, the operating point on the $\phi-I$ characteristic shifts from P4 to P5, from P5 to P6, and then from P6 to P7, leading to saturation. Until such saturation is achieved, however, that is, during the time that the flux is reduced by $\Delta\phi_s$, the inductance L is extremely large and the magnetic amplifier 15 remains in the OFF state. When saturation is achieved after a predetermined period of time, namely at time $t_3$, the inductance becomes nill, placing the magnetic amplifier 15 in the ON state. It should be noted that the changes in flux $\Delta\phi_r$ and $\Delta\phi_s$ illustrated in FIG. 4A are equal, and that this also holds for the voltage-time products Sr and Ss depicted by the shaded portions in FIG. 4B. In addition, the voltage-time products Sr and Ss are dependent upon V2, while V2 is dependent upon the control current $I_C$ produced as the error signal by the error sensing circuit 18. Thus, the products Sr and Ss increase in value when the output voltage increases in comparison with the reference voltage, and decline in value when the output voltage decreases relative to the reference voltage. The result is that the pulse width $P_{WS}$ (FIG. 4B) is regulated in such a manner that the output voltage is made to equal the reference voltage.

Figure 1:
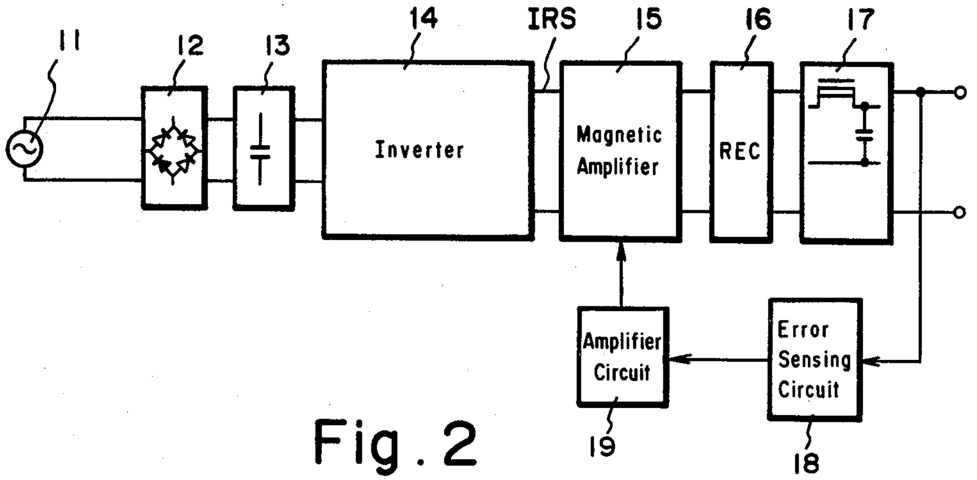
Fig. 1 (PRIOR ART)
FIG. 1 is a block diagram of a stabilizing power supply apparatus which uses a magnetic amplifier as a switching element.
Figure 2:
FIG. 2 is a waveform diagram illustrating the output voltage of an inverter.
Figure 5:
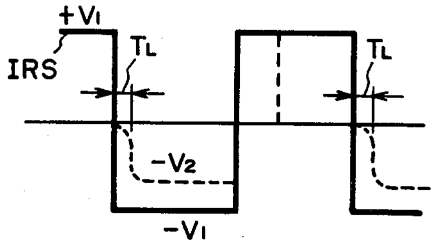
FIG. 5 is a waveform diagram useful in describing a reduction in utilizable pulse width.

In order to maintain a stable output voltage for a wide range of input voltages, it is necessary that the output pulse width of the magnetic amplifier 15 be variable over as wide a range as possible. Theoretically, the pulse width is capable of being varied from 0 up to a width of $t_4-t_2$. However, in the prior-art stabilizing power supply apparatus using a magnetic amplifier, the diode D3 is not provided in the amplifier circuit and the collector of the transistor Q2 is connected directly to the negative power supply line, with the result that the effective pulse width is less than the maximum width given by $t_4-t_2$. The reason for this is that the reset current $I_R$ flows only when the inverter output voltage IRS is negative, whereas the control current $I_C$ is continuously supplied by the error sensing circuit 18. Consequently, when the inverter output voltage IRS is positive, a current flows from the base to the collector of transistor Q2 and then into the negative power supply line, with a charge accumulating on the base of transistor Q2. The effect of the stored charge is such that, when the inverter output voltage IRS goes negative, the transistor Q2 is turned on irrespective of the magnitude of the control current $I_C$ as long as the latter is non-zero. This forces the magnetic amplifier 15 into the reset state. The foregoing may be better understood from FIG. 5, wherein it is seen that the output voltage V2 of the magnetic amplifier 15 changes in the manner shown by the broken line, so that the effectively utilizable pulse width is diminished by $T_L$, correspondingly degrading stability.

In contrast to the foregoing, the arrangement of the present invention has the diode D3, connected in reverse bias with respect to the control current $I_C$, provided between the collector of the NPN-type transistor Q2 and the negative power supply line. When the inverter output voltage IRS is positive, therefore, charge will not collect on the transistor base, thereby making it possible to enlarge the effective pulse width.

It should be noted the effect of the invention can be enhanced by adopting a high-speed switching arrangement for either the transistor Q2 or diode D3, or for both of these elements.

In accordance with the present invention as described and illustrated hereinabove, the dead time of the magnetic amplifier is reduced or, in other words, the effective pulse width is enlarged. This makes it possible to hold the output voltage steady for a wide range of input voltages, and to enlarge the range over which the output voltage can be varied.

Since many widely different embodiments of the present invention can be made without departing from the spirit and scope thereof, it is to be understood that the invention is not limited to the specific embodiments thereof except as defined in the appended claims.

We claim:

1. A stabilizing power supply apparatus, comprising:
an inverter for producing a pulsed voltage;
a magnetic amplifier, operatively connected to said inverter, for pulse-width modulating the pulsed voltage from said inverter and producing a modulated voltage;
a rectifying circuit, operatively connected to said magnetic amplifier, for rectifying the modulated voltage from said magnetic amplifier and producing a rectified voltage;
a smoothing circuit, operatively connected to said rectifying circuit, for smoothing the rectified voltage from said rectifying circuit and producing an output voltage;
an error sensing circuit, operatively connected to said smoothing circuit to receive the output voltage from said smoothing circuit, for sensing a difference between the magnitude of said output voltage and the magnitude of a reference voltage and producing an error signal, the magnitude of the error signal corresponding to the difference, the error signal serving as a control current; and
an amplifier circuit, operatively connected to said magnetic amplifier and said error sensing circuit to receive the control current from said error sensing circuit, for amplifying the control current into a reset signal for said magnetic amplifier, said amplifier circuit comprising:
an NPN-type transistor, having a base operatively connected to said error sensing circuit, a collector and an emitter, for amplifying the control current from said error sensing circuit into the reset current;
a first diode having an anode terminal operatively connected to a negative power supply line and a cathode terminal operatively connected to the collector of said transistor; and
a second diode, having an anode terminal operatively connected to the emitter of said transistor and a cathode terminal operatively connected to said magnetic amplifier, for supplying the reset current to said magnetic amplifier to hold the magnitude of the output voltage of said smoothing circuit constant by regulating the on/off timing of said magnetic amplifier in accordance with the difference between the magnitude of the output voltage and the magnitude of the reference voltage.

2. A stabilizing power supply apparatus according to claim 1, wherein said transistor comprises a high-speed switching transistor.

3. A stabilizing power supply apparatus according to claim 1, wherein said first diode comprises a high-speed switching diode.

4. A stabilizing power supply apparatus according to claim 1, wherein said transistor comprises a high-speed switching transistor and said first diode comprises a high-speed switching diode.

* * * * *

UNITED STATES PATENT AND TRADEMARK OFFICE
CERTIFICATE OF CORRECTION

PATENT NO. : 4,460,955

DATED : July 17, 1984

INVENTOR(S) : Hattori et al.

It is certified that error appears in the above-identified patent and that said Letters Patent is hereby corrected as shown below:

Front page [57] ABSTRACT, line 3, "by" should be --by an inverter--;
line 4, "by" should be --by a--;
"An inverter, an" should be --An--;
line 16, "base the" should be --base. The--.

Col. 3, line 21, "O-I" should be --Ø-I--;
line 38, "R2, R3 and" should be --R2 and R3--.

Col. 4, line 42, "n" should be --n--;
line 50, delete "time" (first occurrence).

Signed and Sealed this

*Twenty-fourth* Day of *September 1985*

[SEAL]

*Attest:*

DONALD J. QUIGG

*Attesting Officer*

*Commissioner of Patents and Trademarks—Designate*